Aug. 20, 1957 C. M. KINGHORN 2,803,730
METHOD OF FORMING LINED TUBING
Filed May 4, 1955
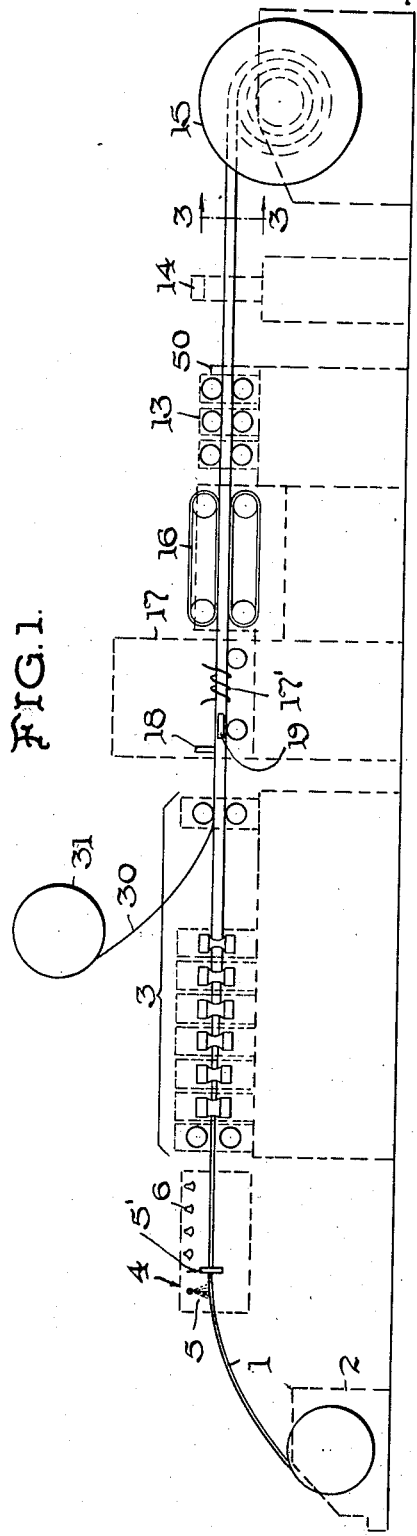
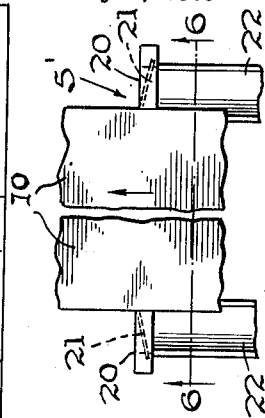
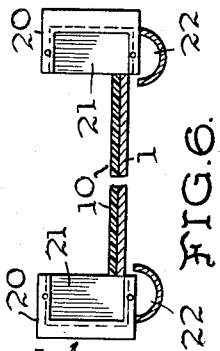
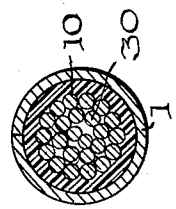
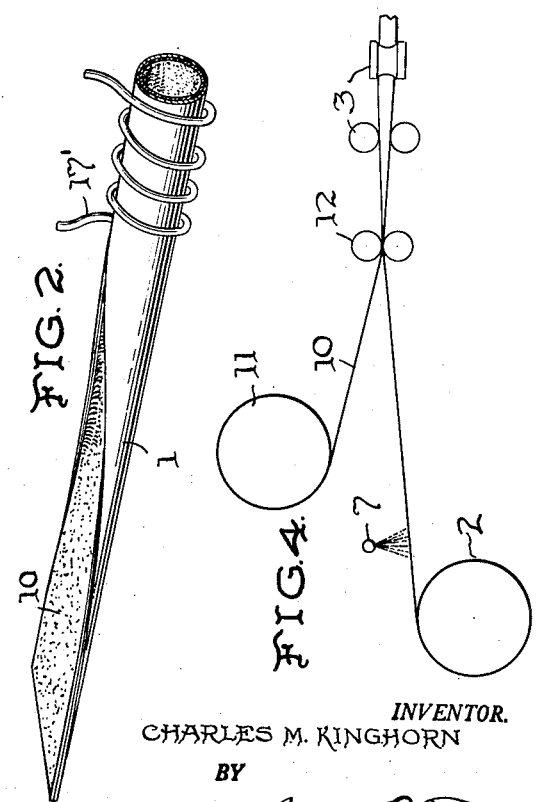
INVENTOR.
CHARLES M. KINGHORN
BY
James E. Tooney
ATTORNEY

United States Patent Office 2,803,730
Patented Aug. 20, 1957

2,803,730

METHOD OF FORMING LINED TUBING

Charles M. Kinghorn, Wilmette, Ill., assignor to Kaiser Aluminum & Chemical Corporation, Oakland, Calif., a corporation of Delaware Application May 4, 1955, Serial No. 505,913

24 Claims. (Cl. 219—8.5)

This invention relates to the manufacture of tubing from a continuously advancing strip of metal. More particularly, it is concerned with providing a novel process for fabricating metallic tubing lined with a suitable plastic material with the tubing in turn being formed from a continuously advancing strip of metal.

Metallic tubing material lined with a suitable plastic film or covering has widespread utility, particularly in the transporting and conveying of liquids which are ordinarily highly corrosive to metal, such as in the chemical industry.

It has previously been proposed to substitute and utilize various plastic materials solely as the materials for conduits used to transport liquids corrosive to metal. One of the disadvantages of using such plastic materials, however, is that the plastic materials do not have the inherent rigidity and strength of metallic tubing and the materials themselves are expensive. Furthermore, the attempts made heretofore to manufacture plastic lined tubing for use in transporting liquids ordinarily corrosive to metal have been deficient of commercial success because of the high cost of manufacture.

The process of fabrication to be hereinafter described can be used advantageously not only as a means for manufacturing plastic lined tubing for use in transporting liquids containing acids, alkali or the like, but also as a means for manufacturing plastic lined tubing used as a composite sheath for electrical conductors.

Accordingly, it is a primary object of this invention to provide a novel and economical process for forming plastic lined metallic tubing.

A further object of this invention is to provide an improved process for producing thermoplastic lined metallic tubing wherein roll forming and induction welding operations are involved.

A more specific object of this invention is to provide an improved process for the induction welding of lined metallic tubing wherein the tubing is formed from a continuously advancing strip of metal, and wherein at the time the metal portions of the tubing edges are welded together, the opposing edges of a previously applied plastic lining are simultaneously fused or sealed together adjacent the seam edges of the tubing.

Another object of this invention is to provide an improved process for producing plastic lined metallic tubing wherein extremely high fabricating speeds can be accomplished.

Another object of this invention is to provide a novel process for fabricating a metallic tubing having an impervious plastic lining therein.

A further object of this invention is to provide a novel process for applying a plastic lining to a continuously advancing sheet of aluminum, forming the lined sheet into a tubing, and thereafter securing the free edges of both the lining and the metallic portions of the completed tubing together simultaneously during passage of the tubing through an electromagnetic field produced by a high frequency alternating current.

Another object of this invention is to provide an improved process for forming and induction welding a plastic lined metallic tubing about an electrical conductor.

A further object of this invention is to provide a novel process for applying a plastic lining to a continuously advancing sheet of aluminum, forming the lined sheet of aluminum into a composite sheath about an electrical conductor and thereafter securing both the plastic lining and metallic portions of the sheath together and about the conductor during passage of the conductor and sheath assemblage through an electromagnetic field produced by a high frequency alternating current.

These and other objects of the instant invention are accomplished by providing a method for continuously forming lined metallic tubing for a liquid conduit or as a composite cable sheathing involving the steps of progressively and continuously applying and securing a film of thermoplastic material to the inner surface of an advancing strip of metal so as to form an inner lining thereon, progressively shaping the moving and lined strip of metal into an open seamed tubing, and thereafter while passing said lined tubing through an electromagnetic field produced by a high frequency alternating current, progressively and continuously drawing the seam edges of the metallic tubing toward one another until they meet and a weld is effected, and simultaneously with the welding of the seam edges of said metallic tubing, advantageously utilizing the heat generated during the welding operation to soften and seal the free edges of said plastic lining together adjacent the seam in said tubing. In the event the lined tubing is to be used as a sheath for an electrical conductor, the conductor may be inserted in the formed tubing just before it enters the induction welding unit.

Other objects and advantages of the instant invention will become more apparent by reference to the following detailed description when taken in conjunction with the appended drawings, which are to be regarded as illustrating preferred embodiments and in no way as limiting the scope of the invention.

Figure 1 is a diagrammatic illustration showing the preferred arrangement of one form of apparatus which may be used for performing the process of the instant invention;

Figure 2 is a perspective view with parts removed showing the feeding of a lined pipe toward an electromagnetic field such as might be caused by an induction welding coil;

Figure 3 is a cross-sectional view of the finished welded lined tubing produced by the novel process of the instant invention when taken along lines 3—3 of Figure 1;

Figure 4 shows a modified type of apparatus which may be employed to apply the plastic material to what constitutes the inner surface of the tubing prior to the formation and welding operation in lieu of the arrangement disclosed in Fig. 1 wherein the plastic material is sprayed upon the inner surface of the tubing and secured thereto by a drying operation;

Figure 5 is a broken plan view of one type of wiper or scraper apparatus that may be used after the plastic coating operation shown in Fig. 1 to prevent dripping and adhesion of the coating to the metal edges of the tubing;

Figure 6 is a cross-sectional view taken along lines 6—6 of Figure 5; and

Figure 7 is a cross-sectional view of a cable to which a composite sheathing has been applied by use of the novel process of the instant invention.

As is indicated in Fig. 1, the metallic sheet or strip material 1 from which the tubing is formed is fed from a coil box or holder 2 toward a series of power driven forming rolls 3. The various rolls in this group of power driven rolls not only perform the function of forming the strip 1 into a tubular shape, but they also act as feed rolls.

Located immediately adjacent the series of rolls 3 is a plastic liner applying unit 4. In an advantageous embodiment of the invention the plastic liner applying unit may comprise a spray device 5, a scraper assembly 5′, and a drying unit 6. After the plastic material 10, which is preferably a thermoplastic, such as polyethylene, is sprayed in particle form and in a uniform layer upon the inside surface of the advancing metal strip, which may be aluminum, by the spray device 5, the strip is passed between the scraper assembly 5′. This scraper assembly 5′ may comprise a pair of oppositely disposed C-shaped brackets 20, each of which holds a wiper element 21 as indicated particularly in Figs. 5 and 6. The wipers 21 contact only the marginal edges of the advancing strip and act to force any plastic material thereon into the carry-off trough 22, thereby keeping the metal edges of the strip 1 free of foreign matter which is essential in the final welding operation. The wipers 21 may be made of any suitable material and may have any suitable configuration. Means may also be provided for heating the same so as to prevent the adherence of the plastic material 10 thereto. Thereafter, the lined strip 1 is passed below one or more banks of infra-red lamps 6 which operate to dry the plastic particles applied in a wet state to the advancing strip, causing them to fuse with one another and adhere to the inner surface of the strip 1. The lined strip 1 is then passed from unit 4 through the banks or assembly of rolls 3 where it is roll formed into tubular shape.

In a modified form of the invention, as indicated in Fig. 4, the film of plastic material 10 may be applied in sheet form to the inside surface of the strip 1 in lieu of being sprayed onto the strip. In this event while the strip 1 is being continuously and progressively unwound from the uncoiling station 2, it is first coated by a spray coating device 7 with a suitable adhesive material which clings to the inside surface of the strip. Thereafter, the thermoplastic lining material 10 such as polyethylene is unwound from a reel 11 in a continuous fashion and directed toward the strip 1 until it comes in contact with the inside surface thereof adjacent the pressure roll assembly 12 which acts to press the strip of polyethylene 10 into contact with the adhesive on the inner surface of the strip 1 so that it will be firmly anchored to strip 1. From roll assembly 12, the lined strip is next directed to the group of forming rolls 3. The assembly comprising the lining 10 and partially roll formed metal strip 1 is finally passed from the remaining roll stands of roll assemblage 3 whereby the strip is formed into open seamed laminated tubing to a suitable induction welding unit 17. It is also within the contemplation of this invention that prior to feeding the strip 1 into the first roll stand of the roll assemblage 3 the strip may be passed through suitable edge shears, not shown, in order to properly trim the edges in preparation for the subsequent welding operation in those instances where the edges of the coil strip are unduly rough or uneven. Such an edge shearing operation also may be beneficial in removing objectionable oxide formation and any plastic particles still present after the wiping operation from the side edges of the metallic tubing.

Any suitable type of induction welding unit may be employed for welding the two opposed seam edges of the metallic strip together. At the same time the opposed seam edges of the strip are welded together the plastic lining or film 10 on the inside of the tubing will, because of the sufficient heat generated during the welding operation, be fused and set, thereby producing a plastic lined tube or similar article. After the welding operation, the welded laminated tubing is then passed through a series of straightening and sizing rolls generally indicated at 13 which give the plastic lined pipe a slight reduction in diameter. From there the pipe material may be, if desired, directed to a suitable coiling reel 15. Located intermediate the coiling reel 15 and the sizing rolls 13 is a suitable automatic cut-off mechanism 14 for cutting off various lengths of lined pipe, or for cutting off the pipe at such times as a complete coil of pipe has been wound on the reel 15. In addition, it has also been found advantageous to locate a series of caterpillar type belt elements 16 between the welding station unit 17 and the sizing rolls 13. These caterpillar belts assist in drawing the welded tubing through the welding station unit 17 at a uniform speed. They also act to eliminate slippage of the formed tube through rolls 13 and serve to maintain a constant speed of operation so as to eliminate pin holes in the weld formed during welding of the tubing thereby insuring a sound weld.

The heating station or welding unit 17 generally comprises a high frequency induction heating means which may take various forms. Examples of such heating means are shown in Patent 2,687,465 to Crawford and Patent 2,692,322 to Bennett. In one form, for example, it may comprise a coil 17′ so constructed that the longitudinal axis of the coil will be parallel to the axis of the lined tubing assembly passing through the center thereof. The coil 17′ may be of hollow copper tubing or other suitable material through which cooling fluid may be circulated. The current frequencies employed in the induction coil may vary over a wide range of from 2000 cycles or less for large diameter tubings up to as high as 500,000 cycles per second for very small tubings, depending upon factors such as speed of travel of the tubing assembly through the magnetic field set up by the induction coil and the diameter and wall thickness of the roll formed tubing, it generally being understood that the smaller the diameter of the tubing fabricated, the higher must be the alternating current frequency to produce a satisfactory weld.

As the two opposed tubing seam edges of the roll formed strip 1, which is preferably aluminum, enter the coil 17′ the edges are spaced apart a small but predetermined distance. During progressive movement of the tubing through the coil 17′, the spaced seam edges are progressively caused to be forced into contact with one another at a point at or near the outer or right hand end of the coil as viewed in Figs. 1 and 2, or closely adjacent the exit end thereof. The high frequency coil 17′ upon energization sets up an alternating electromagnetic field which in turn causes effective alternating current voltage to be induced in substantially only that portion of the lined tubing located between the inner and outer ends of the coil.

It is known, of course, that the strength of the electromagnetic field of a coil drops off very rapidly relatively close to the physical extremities of the coil. As mentioned hereinbefore, the tubing seam is held open during travel of the tubing through the major and preferably the entire length of the induction heating coil 17′. Due to the spacing of the opposed seam edges, there will not be a flow of current across the seam edges. When the seam edges are forced into contact at a point at or near the physical extremities of the induction heating means, such as the exit end of the coil 17′, current will be caused to flow across the seam at the point of edge contact. The quantity of current which will be caused to flow across the seam at the point where the edges are forced into contact with each other is directly related to the voltage which has been induced in the portion of the tubing which at that instant is in the electromagnetic field set up by the coil 17′. By maintaining the spaced seam edges apart at a distance which will prevent any appreciable arcing, substantially all of the current flow induced in the lined tubing section within the electromagnetic field of coil 17″ at any one instant will be concentrated at the point where the opposed seam edges are brought together, thus giving rise to very intense heat at this point whereby fusion of the opposed seam edges of the metallic portions of the tubing as well as the opposed edges of the plastic film located on the inner surface of the tubing is effected.

While the manner of heating the opposed seam edges of the tubing is one primarily of resistance type, sometimes an arc will develop for a relatively short distance before the point where the seam edges are forced together. This arcing does not appreciably heat up the opposed seam edges, and furthermore, there is a tendency for the slight amount of arcing that may occur to remove any oxide film or adherent plastic material that may still be present on the opposed edge surfaces of the seam edges of the metallic strip thereby insuring the production of a sound metal seam freed of impurities.

In order to accurately control the spacing of the opposed metal seam edges such that they do not contact one another during the passage through the coil 17' until they have reached a predetermined point of contact at or just beyond the exit end of the induction heating means or coil 17' to insure a concentrated flow of induced current across the seam at this predetermined point, a suitable seam guide 18 and side pressure rolls 19 may be provided in the induction welding unit 17. Various conventional seam guides are used in the longitudinal welding of tubing, one of which comprises a vertically and laterally adjustable fin suitably mounted above the open seam and extending downwardly between the opposed seam edges may be used. This holds the seam edges apart to prevent arcing therebetween. To provide against any passage of induced current from one seam edge to the other because of the seam guide or stationary fin, the fin may be composed of metal plates or sheets suitably insulated from one another. This seam guide also functions to prevent any tendency of the roll formed tubing to twist or turn thereby properly positioning the open seam for passage past the induction heating coil 17'. In this connection also, the caterpillar belt assemblies 16 referred to above also are advantageously used in that they eliminate slippage of the tubing material in the heating unit and maintain a constant speed of the operation. Thus, the tubing will be uniformly drawn through the induction heating unit, thereby producing a sound weld in the metal tubing and proper sealing of the free edges of the plastic material adjacent the seam.

By the use of the high frequency induction heating of the metallic seam edges of the tubing, this heating will be one of only localized character. Only a very narrow longitudinal portion of the sheathing will be heated and this portion is confined primarily to the area of the opposed seam edges. It has been found that the overall heat rise in the tubing does not exceed about 200° F., which, although substantially below the melting point, still closely approximates the temperature at which most thermoplastic materials suitable as a lining will soften and readily flow so as to produce a fusion and sealing between adjacent edges of such materials. Further, the rate of transit of the lined tubing through the electromagnetic field is so rapid, it being on the order of 60 feet or more per minute, that serious melting and dripping of the thermoplastic material is precluded because the heating is localized and takes place for only a relatively short period of time.

In an advantageous embodiment of the invention and in those instances where only a lined tubing is being fabricated, a cooled inert gas such as argon or helium may be introduced under pressure into the interior of the tubing immediately adjacent the point where the weld is effected. Suitable means, not shown, can be used to confine the gas within the boundaries defining the weld zone.

This gas can be advantageously used as a cushion or support for the molten metal of the seam edges within the welding zone, thereby inhibiting the formation of an internal bead on the tubing at the point of the weld. It will also act in a similar manner to cause uniform fusion between the opposed edges of the thermoplastic lining with the end result that there will not be an undesirable bead of plastic material on the interior of the tubing.

Although various metals may be employed in making the lined tubing by the novel process disclosed herein, the preferred embodiment of the invention contemplates the utilization of an aluminum strip which is coated with a suitable thermoplastic material 10. The wall thickness of the aluminum tubing, which may be rapidly and satisfactorily welded by means of the invention, may cover a wide range by the proper selection of the frequency and welding speed, although the general preferred ranges vary from .025" to .150".

In a further advantageous embodiment of the invention the process for manufacturing plastic lined liquid conduit tubing described above may also be used as a means for applying a composite plastic and metal sheath to an electrical conductor. In this event, it is only necessary that provision be made for feeding a conductor cable 30 which may or may not have been covered with a layer of insulation from a reel 31 down between the last stand of rolls and the remainder of the rolls in roll assemblage 3 and into the trough of the partially formed plastic lined strip. Passage of the lined tubing with the cable located therein through the sizing rolls 13 will cause the composite sheathing or lined tubing to fit snugly and tightly about the conductor.

By means of the instant invention it is possible to satisfactorily weld aluminum lined tubing at speeds commercially applied to the welding of other tubes which are not lined and made of various metals and yet produce a sound seam weld as well as a uniformly lined tubing. The exterior and interior surfaces of the resultant tubing will be perfectly smooth and comparable to the surface of seamless extruded or drawn tubing.

In another advantageous embodiment of the invention, it is also contemplated that a suitable corrugating attachment 50 may be associated with the sizing or reducing rolls 13 for the purpose of imparting undulations or corrugations to the tubing 1 transverse to the axis thereof. These corrugations will not only assist in reducing the effective internal diameter of the lined metallic tubing so that it will be brought into tight engagement with the cable in the event the tubing is used as a sheath for a cable, but they will also lend remarkable flexibility to the tubing during application or use. The pitch, ratio and range of depth of the corrugations are graded in relation to the external diameter of the tubing. In addition, because of this inherent flexibility effected by corrugating, little effort is required to bend the finished metallic tubing and it also resists damage and undue distortion.

Although advantageous embodiments of the invention have been herein illustrated and described, it will be understood that various changes may be made therein without departing from the true spirit and scope thereof as defined by the appended claims, wherein what is claimed is:

1. A method of continuously forming a plastic lined metallic tubular member comprising the steps of progressively and continuously applying and securing a film of thermoplastic material to the inner surface of an advancing strip of metal so as to form an inner lining thereon, progressively shaping the advancing lined strip of metal into an open seamed tubular member, and thereafter while passing said lined tubular member through an electromagnetic field produced by a high frequency alternating current means, inducing and concentrating a welding current adjacent the seam edges while progressively and continuously drawing said seam edges of said tubular member toward one another until they meet and a weld is effected between metallic portions of the tubular member and substantially simultaneously with the welding of the seam edges of said metallic portions of the tubular member heating and effecting a fusion of the free edges of said thermoplastic lining adjacent the seam of said tubular member.

2. The method as claimed in claim 1, wherein the metallic strip material used is aluminum.

3. The method as claimed in claim 1, wherein the thermoplastic lining material used is polyethylene.

4. A method of continuously forming lined metallic tubing comprising the steps of progressively and continuously spraying particles of a thermoplastic material in a wet state onto the inside surface of a continuously advancing strip of metal, heating said thermoplastic material so as to dry and secure said plastic material to said strip of metal, progressively and continuously shaping said lined strip of metal into an open seamed tubing and thereafter while passing said lined tubing through an electromagnetic field produced by a high frequency alternating current, inducing and concentrating a welding current adjacent the seam edges while progressively and continuously drawing said seam edges of said lined tubing toward one another until they meet and a weld is effected between the metallic portions of the tubing and simultaneously with the welding of said tubing, heating and fusing the free edges of said thermoplastic lining adjacent the seam of said tubing.

5. The method as claimed in claim 4, wherein the strip material used is aluminum.

6. The method as claimed in claim 4, wherein the lining material used is polyethylene.

7. A method of continuously forming plastic lined metallic tubing comprising the steps of progressively and continuously applying and securing a sheet of thermoplastic material to the inner surface of a continuously advancing strip of metal, progressively and continuously shaping said lined strip of metal into an open seamed tubing and thereafter while passing said lined tubing through an electromagnetic field produced by a high frequency alternating current means inducing and concentrating a welding current adjacent the seam edges, progressively and continuously drawing said seam edges of said lined tubing toward one another until they meet and a weld is effected between the metal edges of said tubing and substantially simultaneously with the welding of the metallic edges of said tubing, heating and fusing the free edges of said thermoplastic lining material adjacent the seam of said tubing.

8. The method as claimed in claim 7, wherein said metallic strip is aluminum.

9. The method as claimed in claim 7, wherein the plastic lining material is polyethylene.

10. A process for continuously forming plastic lined metallic tubing comprising the steps of progressively and continuously applying and securing a film of thermoplastic material to the inner surface of an advancing strip of metal so as to form a lining thereon, progressively shaping the moving strip of metal into an open seamed tubing, then while passing said lined tubing past a high frequency electromagnetic inductive means continuously drawing the seam edges of said tubing toward one another in such a fashion that the seam edges will be brought together at a point beyond the exit end of the electromagnetic inductive means thereby causing substantially all the current induced in the tubing by said electromagnetic inductive means to concentrate adjacent said seam edges and flow across the point of surface contact between the seam edges of the tubing adjacent the exit end of the electromagnetic field so as to effectively weld the metallic portions of the seam edges of said tubing while simultaneously heating and sealing together the free edges of said thermoplastic liner material.

11. The process as claimed in claim 10, wherein said metallic strip is aluminum.

12. The process as claimed in claim 10, wherein said thermoplastic lining material is polyethylene.

13. A process for continuously forming plastic lined metallic tubing comprising the steps of spraying particles of a thermoplastic material in a wet state and onto the inside surface of an advancing metallic strip, heating said thermoplastic material so as to dry and secure the thermoplastic material to the metallic strip, progressively shaping a moving strip of metal into an open seamed tubing, then while passing said lined tubing through an electromagnetic field produced by a high frequency alternating current, progressively and continuously drawing the seam edges of said lined tubing toward one another in such a fashion that the seam edges will be brought together at a point adjacent the exit end of the electromagnetic field thereby causing substantially all of the current induced in the tubing by said electromagnetic field to concentrate adjacent said seam edges and flow across the point of surface contact between the seam edges of the tubing adjacent the exit end of the electromagnetic field so as to effectively weld the metallic portions of the seam edges on said tubing while simultaneously heating and sealing together the free edges of said thermoplastic liner material.

14. The process defined in claim 13, wherein said metallic strip is aluminum.

15. The process as claimed in claim 13, wherein said plastic material is polyethylene.

16. A process for continuously forming plastic lined metallic tubing comprising the steps of progressively applying and securing a sheet of thermoplastic material to the inner surface of an advancing strip of metal, progressively shaping the moving lined strip of metal into an open seamed tubing, then while passing said lined tubing through an electromagnetic field produced by a high frequency alternating current, progressively and continuously drawing the seam edges of said tubing toward one another in such a fashion that the seam edges will be brought together at a point adjacent the exit end of the electromagnetic field thereby causing substantially all of the current induced in the tubing by said electromagnetic field to concentrate along said seam edges and flow across the point of surface contact between the seam edges of the tubing adjacent the exit end of the electromagnetic field so as to effectively weld the seam edges of said metallic portions of said tubing while simultaneously heating and fusing together the free edges of said thermoplastic liner material.

17. The process as defined in claim 16, wherein said metallic strip is aluminum.

18. The process as claimed in claim 16, wherein said plastic material is polyethylene.

19. In a method of continuously forming a composite plastic and metal tubular member as a composite sheathing about an electrical conductor, the steps of progressively and continuously applying and securing a film of thermoplastic material to the inner surface of an advancing strip of metal so as to form an inner lining thereon, progressively shaping the advancing lined strip of metal into an open seamed tubular member, progressively and continuously depositing an electrical conductor into said open seamed tubular member, and thereafter while passing said lined tubular member through an electromagnetic field produced by a high frequency alternating current inducing and concentrating a welding current adjacent said seam edges, progressively and continuously drawing said seam edges of said tubular member toward one another until they meet and a weld is effected between the metallic portions of the tubular member and simultaneously with the welding of the seam edges of said metallic portions of said tubular member heating and effecting a sealing of the free edges of said thermoplastic lining about the conductor and adjacent the seam of said tubular member.

20. The method as defined in claim 19, wherein the thermoplastic material is sprayed in a wet state onto the advancing strip in particle form and then heated.

21. The method as defined in claim 19, wherein the thermoplastic material is adhesively applied in sheet form to the advancing strip.

22. In a method of continuously forming a composite plastic and metal tubular member as a composite sheathing about an electrical conductor, the steps of progressively and continuously applying and securing a film of thermoplastic material to the inner surface of an advancing strip of metal so as to form an inner lining thereon, progressively shaping and forming the advancing lined strip of metal into an open seamed tubular member, progressively and continuously depositing an electrical conductor into said open seamed tubular member, and thereafter while passing said lined tubing through an electromagnetic field caused by a high frequency alternating current producing means progressively and continuously drawing the seam edges of said lined tubular member toward one another in such a fashion that the seam edges will be brought together at a point adjacent the exit end of the electromagnetic field thereby causing substantially all of the current induced in the tubing by said electromagnetic field to concentrate adjacent said seam edges and flow across the point of surface contact between the seam edges of the tubular member adjacent the exit end of the electromagnetic field so as to effectively weld the metallic portions of the seam edges of said tubular member while simultaneously heating and sealing together the free edges of the plastic liner material to each other and about the conductor.

23. A method of continuously forming a plastic lined metallic tubular member comprising the steps of progressively and continuously applying and securing a film of thermoplastic material to the inner surface of an advancing strip of metal so as to form an inner lining thereon, progressively shaping the advancing lined strip of metal into an open seamed tubular member, and thereafter while passing said lined tubular member through an electromagnetic field produced by a high frequency alternating current means, inducing and concentrating a welding current adjacent the seam edges, progressively and continuously drawing said seam edges of said tubular member toward one another until they meet and a weld is effected between metallic portions of the tubular member and substantially simultaneously with the welding of the seam edges of said metallic portions of the tubular member heating and effecting a fusion of the free edges of said thermoplastic lining adjacent the seam of said tubular member, and thereafter placing corrugations which run transverse to the longitudinal axis of said tubular member in said tubular member.

24. In a method of continuously forming a composite plastic and metal tubular member as a composite sheathing about an electrical conductor, the steps of progressively and continuously applying and securing a film of thermoplastic material to the inner surface of an advancing strip of metal so as to form an inner lining thereon, progressively shaping and forming the advancing lined strip of metal into an open seamed tubular member, progressively and continuously depositing an electrical conductor into said open seamed tubular member, and thereafter while passing said lined tubing through an electromagnetic field caused by a high frequency alternating current producing means progressively and continuously drawing the seam edges of said lined tubular member toward one another in such a fashion that the seam edges will be brought together at a point adjacent the exit end of the electromagnetic field thereby causing substantially all of the current induced in the tubing by said electromagnetic field to concentrate adjacent said seam edges and flow across the point of surface contact between the seam edges of the tubular member adjacent the exit end of the electromagnetic field so as to effectively weld the metallic portions of the seam edges of said tubular member while simultaneously heating and sealing together the free edges of the plastic liner material to each other and about the conductor, and thereafter placing corrugations which run transverse to the longitudinal axis of said tubular member in said tubular member.

References Cited in the file of this patent

UNITED STATES PATENTS

| 1,407,001 | Schroder | Feb. 21, 1922 |
| 1,919,684 | Caputo | July 25, 1933 |
| 1,954,160 | Wheeler | Apr. 10, 1934 |
| 2,697,769 | Carpenter | Dec. 21, 1954 |
| 2,697,772 | Kinghorn | Dec. 21, 1954 |

FOREIGN PATENTS

| 377,655 | Great Britain | Jan. 22, 1930 |